E. W. Tarbell.
Steering.
No. 29,447.        Patented July 31, 1860.
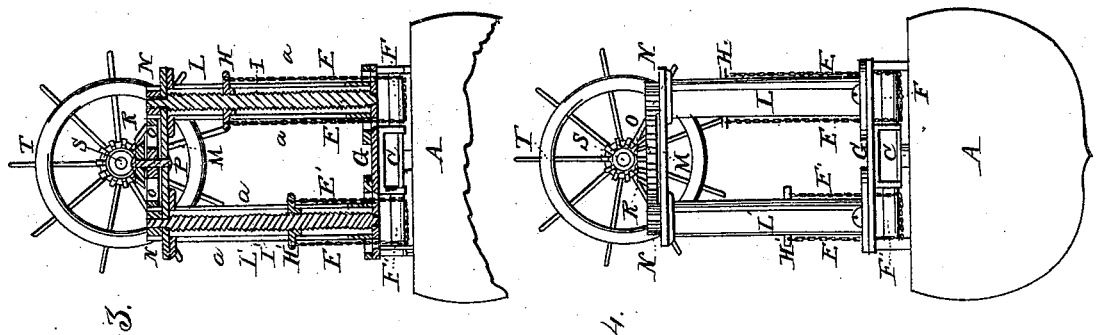
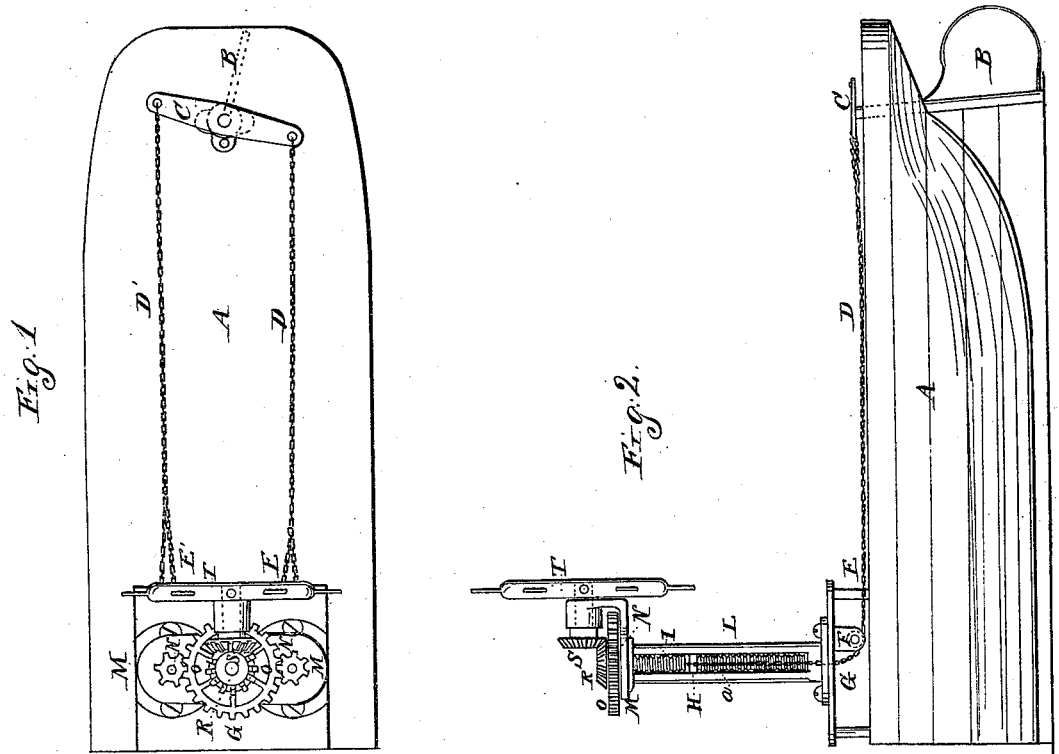
WITNESSES:
R. Kiddy
J. P. Hale Jr.
INVENTOR
E. W. Tarbell

UNITED STATES PATENT OFFICE.

EDMUND W. TARBELL, OF SOUTH BOSTON, MASSACHUSETTS, ASSIGNOR TO HIMSELF AND E. A. SIMONDS, OF SAME PLACE.

STEERING APPARATUS.

Specification of Letters Patent No. 29,447, dated July 31, 1860.

*To all whom it may concern:*

Be it known that I, EDMUND W. TARBELL, of Boston, in the county of Suffolk and State of Massachusetts, have invented an Improved Steering Apparatus for Steamships or other Vessels; and I do hereby declare the same to be fully described and represented in the following specification and the accompanying drawings, of which—

Figure 1, is a top view; Fig. 2, a side elevation; Fig. 3, a transverse section, and Fig. 4, a front view of it, as applied to the hull and rudder of a vessel.

The nature of my invention consists in a combination and arrrangement of two reversed screws and two lifting nuts with tiller leading chains, and with mechanism for simultaneously rotating the said screws.

In the drawings, A, exhibits the after part or half of the hull of a ship; B, being the rudder and C, the tiller extending from the rudder head and at equal distances in opposite directions. From the two extremities of the said tiller, two chains D, D', extend or are led forward and are connected with branch chains E, E', each chain with its branch chain being led partially around one of two guide rollers, F, F, which are arranged and supported under a platform G, as shown in the drawings. The said chains pass around through the platform, and at their extremities are connected with two lifting screw nuts, H, H', which are respectively arranged on two vertical screws, I, I'. Each screw and its nut is placed within one of the columns, L, L', which rest on the platform, G, and serve to support a cap or secondary platform, M. Furthermore, the screws are what are termed reversed screws, one having its threads pitched in a direction opposite to that of the other. Each nut projects in opposite directions through its column and guide slots, a, a, formed therein. A spur pinion N, is fixed on the head of each screw shaft and engages with a gear, O, arranged on the cap M, or on a spindle P, extending upward therefrom as shown in Fig. 3. The gear O carries a bevel wheel R, that engages with another bevel wheel, S, that is, supported on the shaft of a hand wheel T, the whole being arranged as shown in the drawings. By laying hold of and rotating the said hand wheel, the two screws will be simultaneously put in operation in the same direction and so as to cause the nut of one to rise and that of the other to descend on its screw, the movements of the nuts being equal in equal times. In this way the leading chains connected with one nut will be drawn on, while those of the other will be slackened in a like degree whenever the hand wheel is turned either to port or starboard, such an action upuon the chains causing a draft on the tiller and a consequent movement of the rudder.

I claim—

The combination and arrangement of the two reversed screws, I, I', and their lifting nuts H, H', (supported in guide slots or their equivalents) with leading chains (connected with the tiller,) and with mechanism for simultaneously rotating the two screws by means of a hand wheel as described.

E. W. TARBELL.

Witnesses:
R. H. EDDY,
F. P. HALE, Jr.